United States Patent [19]

Giovannoli et al.

[11] 4,282,571

[45] Aug. 4, 1981

[54] ELECTRONIC DISTANCE MEASUREMENT AND DISPLAYING APPARATUS

[76] Inventors: Joseph Giovannoli, 93 Wyckoff Ave., Waldwick, N.J. 07463; Leon Charash, 240 Mt. Vernon Pl., Newark, N.J. 07106

[21] Appl. No.: 5,201

[22] Filed: Jan. 22, 1979

[51] Int. Cl.³ .................. G01C 3/00; G01B 11/02
[52] U.S. Cl. ............................ 364/562; 33/1 L; 33/125 A; 356/396
[58] Field of Search ............ 364/561, 562; 33/125 A, 33/1 L, DIG. 3; 250/202; 356/396–398

[56] References Cited

U.S. PATENT DOCUMENTS

| | | | |
|---|---|---|---|
| 3,599,004 | 8/1971 | Grendelmeier | 250/209 |
| 3,748,043 | 7/1973 | Zipin | 356/397 |
| 3,973,326 | 8/1976 | Gallacher et al. | 33/125 R |
| 4,158,229 | 6/1979 | Woo, Jr. et al. | 364/562 |

Primary Examiner—Felix D. Gruber
Attorney, Agent, or Firm—Gerald Weir

[57] ABSTRACT

An electronic apparatus for measuring, computing, and displaying linear or angular displacements suited in particular to drafting applications. In display mode, the distance data is entered into the apparatus via a keypad and based on previously entered or predetermined scale or other considerations, electronically iluminated indicator markings of the apparatus indicate the beginning and end of a linear or angular segment representative of the entered data. Alternatively, in measuring mode, the illuminated indicator marking representing an index is placed at one limit of the line or angle to be measured and the other limit is indicated to the apparatus by the user such as by alignment of a slidable member with the other limit of the line or angle to be measured. The apparatus will display by LED or other suitable means, the angle or distance in numerical form represented by the displacement limits presented and based on previously entered or predetermined scale or other considerations. The keypad together with the LED display can be used as a calculator as well.

7 Claims, 14 Drawing Figures

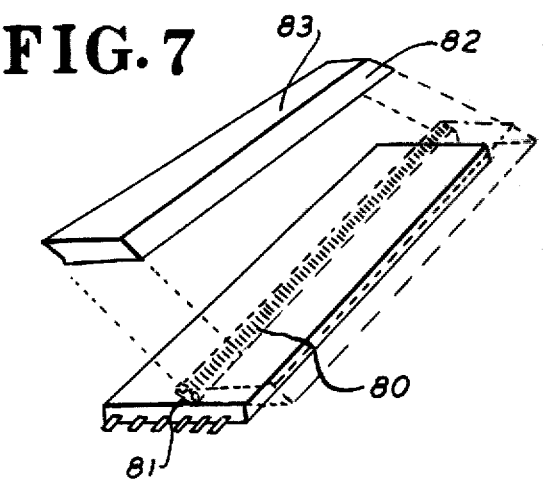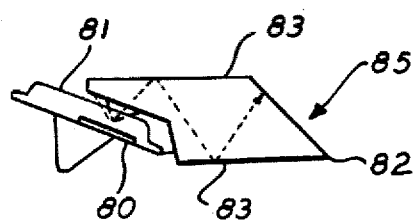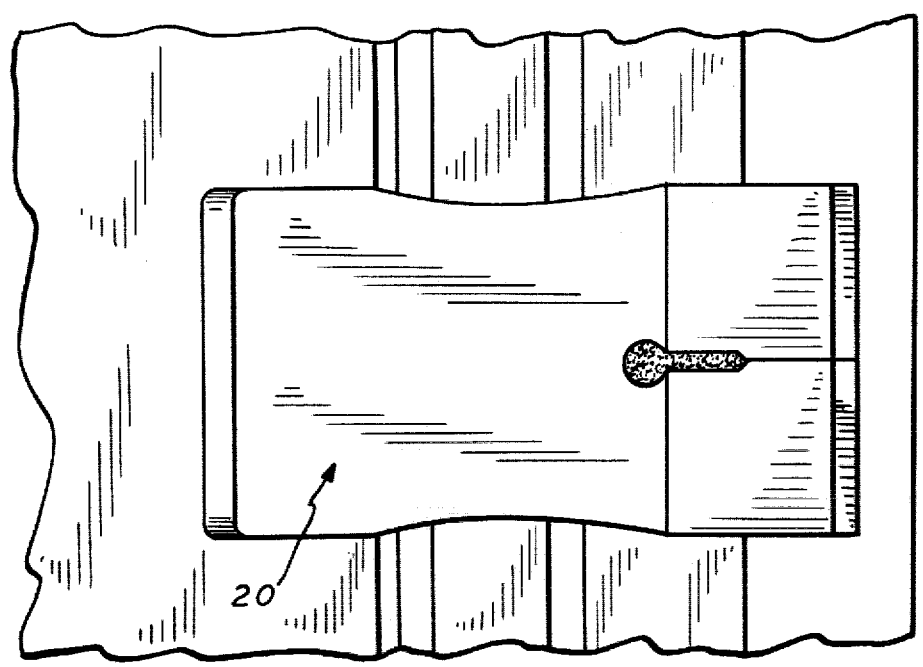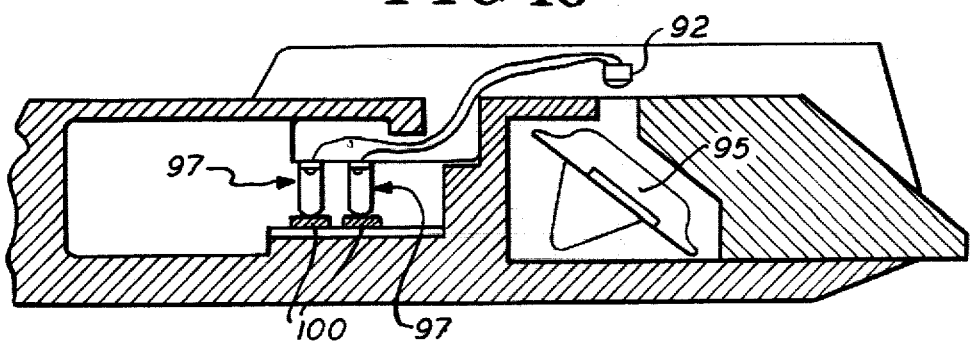

ELECTRONIC DISTANCE MEASUREMENT AND DISPLAYING APPARATUS

BACKGROUND OF THE INVENTION

The present invention relates to devices for measuring and displaying linear or angular displacements and more particularly to scaling devices of the type adapted for use with marking instruments suitable to accurately mark various media surfaces. In particular, the present invention relates to scaling devices commonly encountered in mechanical, architectural and other such drawing pursuits which are used for the purpose of determining line and angle measurements to be applied to drafting as well as ascertaining the decimal or other equivalent of lines or angles on existing draftings or pictures.

Scaling devices presently used have remained unchanged in principal virtually since their creation. In general they are mechanical devices of various configurations but having in common a scale edge with graduations marked thereon which a user employs both for establishing the displacement of a line or angle segment to be drawn or alternatively, applies such a device to an existing drawing and after an appropriate alignment interprets the markings on the mechanical scale proximate the non-index limit thereof to determine the numerical value of the displacement of such segment. Some disadvantages associated with such scaling devices include the need for many scales of different ratios and units which are slow to use because the user must interpret the gradations by converting a fractional or decimal value into the linear displacement which is viewed on the scale. In many cases this is not easy to do because of the need for interpretation between gradations. Moreover, to ensure accuracy, the process should be repeated to confirm the user's initial conclusion. Unfortunately, the present method has attendant thereto, errors in interpretation of scale gradations by the user as well as conversion errors, mathematical errors, confirmation errors and errors in using improper scales to begin with.

The primary object of this invention is to obviate the previously described disadvantages of the prior art by enabling a user to input fractional or digital data into a distance measuring and displaying apparatus together with scale and unit conversion information as required, and to have the device display the displacement of the desired segment in clear illuminated markings of fine gradation and to confirm the length or angle by displaying the numerical value thereof in a clearly readable display.

Another object is to enable the measuring of existing displacements by having the user align the index cursor of the apparatus with one limit of the displacement to be measured and by aligning a slideable or equivalent member with the other limit of the displacement to be measured and having the apparatus display in digital form the precise value of the displacement segment being measured.

In addition to increasing the speed with which displacements can be drawn and measured, the calculating capacity of the device would perform all of the mental functions required for conversion of units and scales, enabling the operator, for example, to enter all data from metric measurements and having all displacements indicated in non-metric units. Another advantage of the invention is the incorporation of appropriate electronic calculating means to enable a user to display or measure displacements which are nonlinear. Such nonlinear displacements are encountered in perspective scaling or measurement from photographs and the like.

SUMMARY OF THE INVENTION

The apparatus of the invention provides for a means for measuring, computing and displaying linear or angular displacements, particularly suited to drafting, architectural drawing and other drafting type applications requiring accuracy. The apparatus functions in two modes. The first mode involves displaying a distance or angle which is known to the user but must be measured before it can be represented in drafting or otherwise. Such distance or angle is entered into the apparatus via a keypad or other suitable means and based on a predetermined or previously entered scale, unit conversion or other considerations, the device thereafter automatically indicates electronically by illuminated cursor markings on the apparatus, the beginning and ending limits of the linear or angular segment represented by the entered data.

The second mode involves measuring a pre-existing angular or linear displacement. In this mode an illuminated cursor marking on the apparatus representing an index is placed by the user at one limit of the line or angle to be measured. The other limit is inputted to the apparatus by the user by means such as a slideable member which is aligned with the other limit or by means of a light pen which is placed proximate the apparatus at a point also proximate the other limit. Other suitable entry means may also be employed. In either case, electronic sensing is accomplished by the apparatus which will then display by LED or other means in digital numerical form representing the value, the displacement limits and previously entered scale or other considerations.

BRIEF DESCRIPTION OF THE DRAWINGS

FIG. 5, is a pictoral perspective view of the module of FIG. 4 comprising in addition, sensing means which are used as shown in the cross-sectional view of FIG. 5a.

FIG. 7, is a pictoral perspective view of a plasma display means together with a prismatic display augmentic means.

FIG. 8, is a cross-sectional view of FIG. 7.

FIG. 9, is a plan perspective view of a moveable cursor useful in determining the length of existing lines.

FIG. 10, is a cross-sectional view of the moveable cursor selector shown in FIG. 9 as applied to a plasma display means.

DETAILED DESCRIPTION

In basic terms, the apparatus of this invention comprises a keypad which inputs to a calculator chip or microprocessor. The microprocessor, based on inputted information, determines in a first display mode, the particular displacement to be displayed on a cursor display means and outputs appropriate information to that end. In addition, the microprocessor outputs to a digital numerical display to provide confirmatory numerical information to the user equivalent to the cursor displacement information supplied to the cursor display means. In a measurement mode, information is inputted to a microprocessor via a predetermined displacement selection method and apparatus, which information is outputted from the microprocessor to the digital display to indicate to a user the numerical equivalent of the selected displacement.

Figure 1:
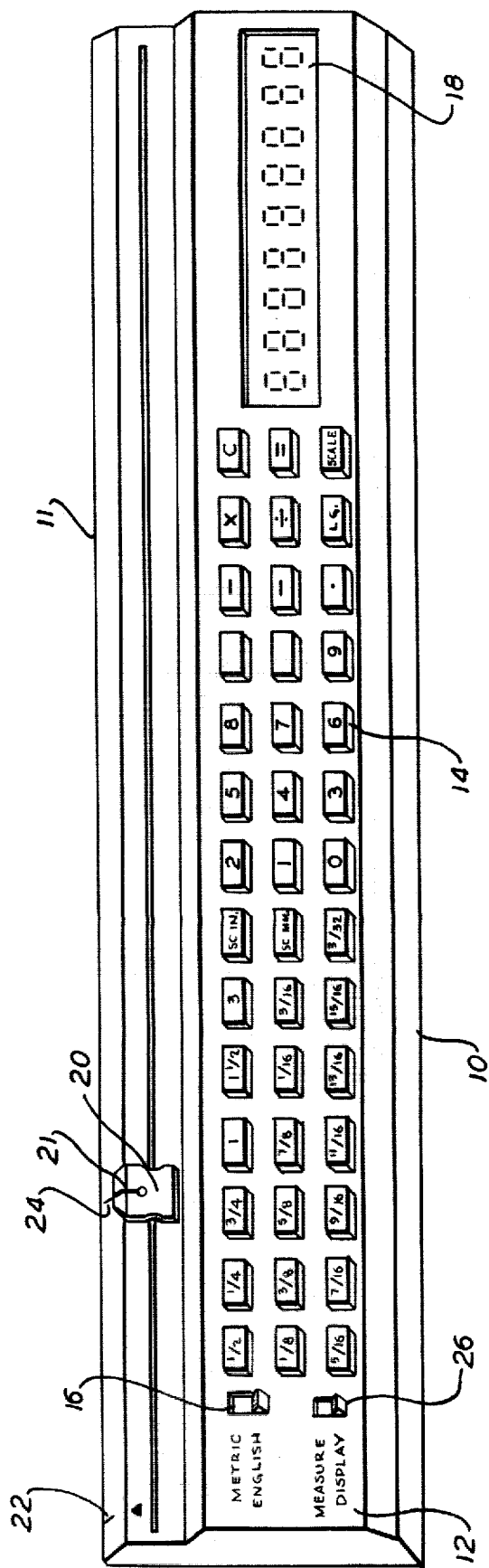
FIG. 1, is a pictoral perspective view of an apparatus of the present invention illustrating the keyboard display and slide measuring mechanism.

With reference to FIG. 1, an apparatus of this invention is shown comprising a case 10 having straightedge 11 and a faceplace 12 on which is arranged keypad 14 and numerical display 18 together with switch 16 for selecting metric or English units and a measure/display switch 26 for selecting the mode of operation for the apparatus. Along straightedge 11 is arranged index cursor 22 which is illuminated by the circuitry of the apparatus and which would be expected to remain illuminated constantly while the apparatus is turned on. In addition, a moveable cursor 24 is illuminated by the circuitry of the apparatus which cursor represents a single segment of a multitude of segments of which only one segment appears to be illuminated at a given time. It is possible, alternatively to have all segments from the index cursor to the moveable cursor 24 lighted simultaneously as well. In the arrangement shown in FIG. 1, moveable cursor selector 20 is positioned proximate to moveable cursor 24 and both are aligned by means of pointing mark 21.

Figure 2:
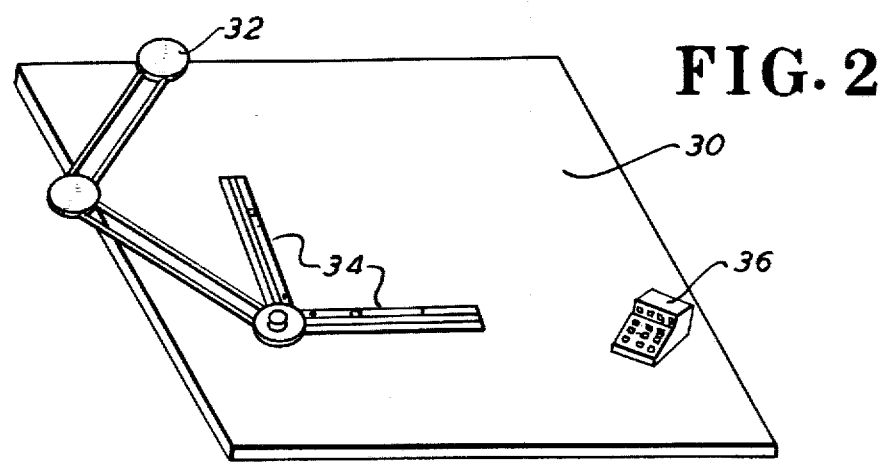
FIG. 2, is a pictoral perspective view of a drafting table with articulated drafting equipment containing apparatus of this invention on the horizontal and vertical straight-edges shown together with a separate keypad and digital display means which are connected to the straight-edges by wires which are not shown.

FIG. 2, shows drafting table 30 having articulated drafting apparatus 32 attached thereto together with straight-edge 34 in a typical drafting arrangement. In this case, straight-edge 34 comprise that portion of the apparatus shown in FIG. 1 which is used to both display a lighted cursor and select a position along the straight-edge by means of a moveable cursor selector 20. The remainder of the apparatus of FIG. 1 including the keypad 14, numerical display 18 and switches 16 and 26 are contained in keypad and numerical display means 36 shown separate from straight-edges 34 in FIG. 2 but is connected thereto by wires not shown.

Figure 3:
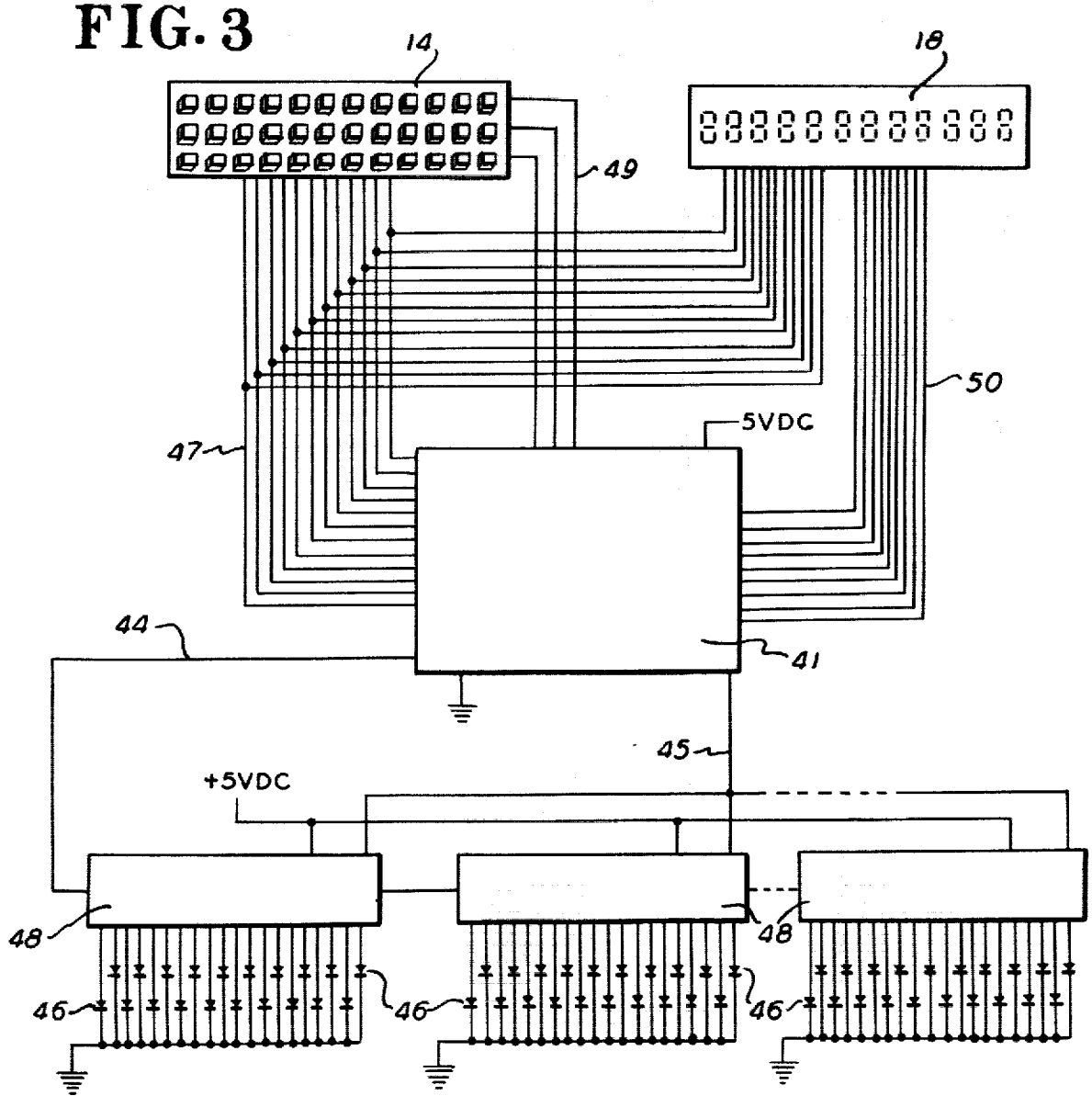
FIG. 3, is a simplified block diagram of the invention showing the relationships between the keypad, digital display, calculator chip and distance display shift registers employing LED technology.

FIG. 3, shows a microprocessor 41 of commonly available design such as the Rockwell International PPS 4/1. Numerical display 18 may be of any suitable type such as light emitting diode, liquid crystal, plasma discharge, floresent, etc. Keypad 14 for data input purposes and microprocessor 41 are connected to shiftregister scale cursor display driver 48, e.g., RCA CD4015A, by means of clock output 45 and a single line output 44. Said shiftregister cursor display drivers 48 provide current individually to each of a plurality of light emitting diodes 46 arranged in a continuous line with accurately controlled regular or proportionate spacing therebetween, typically for drafting purposes of a magnitudes equal to 0.020 inches or 0.5 mm. Said light emitting diodes 46 are arranged near the edge of straightedge 11 as shown in FIG. 1. The same may be connected to shiftregister 48 by mounting them on the same substrate using conventional integrated circuit techniques and fabrication methods. This arrangement would permit the use of only two signal carrying conductors, namely single line output 44 and clock output 45 for each display array. A suitable array size would be 100 light emitting diodes long although any other length suitable for a predetermined application would be appropriate. Using a minimum on interconnections to the shiftregisters 48 would permit the use of a standard microprocessor. Shiftregisters 48 may be constructed using semiconductor technology compatible with LED driving capability and direct interface with standard microprocessors. In the case of the Rockwell International PPS4/1, for example, the shiftregisters would make use of PMOS semiconductor technology. However, other readily available technologies may be used with equal success, such as TTL, NMOS, CMOS, etc. Referring again to FIG. 3, the keypad 14 is of conventional matrix construction commonly used for four function desktop calculators, with additional keys for fractional unit entry as shown in FIG. 1. These additional keys are suggested to increase the ease with which draftsmen, architects and others may enter odd units without multiple keying. Numerical display 18 is of any readily available type and, to minimize manufacturing costs, the numerical display 18 should be of the same type as the scale cursor display such as LEDs 46. This arrangement eliminates the need for numerous power supply voltages. The same lines used to sequentially strobe the keypad matrix, namely keypad stobe lines 47, are used to sequentially activate each of the digits comprising the numerical display 18. As each of said keypad strobe lines 47 is activated in turn, the keypad input lines 49 are reread by the microprocessor to input date corresponding to the depressed keys. Numerical display output lines 50 from microprocessor 41 are provided to energize the appropriate character segments on each of the digits shown in numerical display 18 as each digit strobe line corresponding to the seven segment digital numerical equivalent to be displayed is energized. In this way the number of component interconnections and the cost of microprocessor 41 are thereby minimized. Shift-registers 48 are interconnected such that a logical "1" presented at the single line output 44 will cause the first LED of the array, comprising LEDs 46, to light on the first subsequent clock output pulse from clock output 45. The next clock pulse will cause the second LED to light and so on as long as the single line output 44 is held in the logical "1" state. When the number of LEDs lighted corresponds to the distance to be displayed as shown in numerical form at numerical display 18, the clock pulses are terminated and the display provides a static representation of the distance or angle displayed until a new calculation or entry is produced by the microprocessor 41. On completion of a numerical display, the single line output 44 is set to a logical "0" and clock pulses equal in number to the number of LEDs 46 are produced, thereby clearing the display cursors without the need for digital reset signals. Next a new number of pulses corresponding to the new displacement to be displayed is generated with the single line output 44 set to a logical "1" and the new display is complete. An alternative to this arrangement utilizes the calculator's arithmetic capability to calculate the number of "0s" and "1s" required to update the display prior to generating clock pulses, thereby permitting a complete display update with only "n" clock pulses where "n" is the total number of LEDs.

Figure 4:
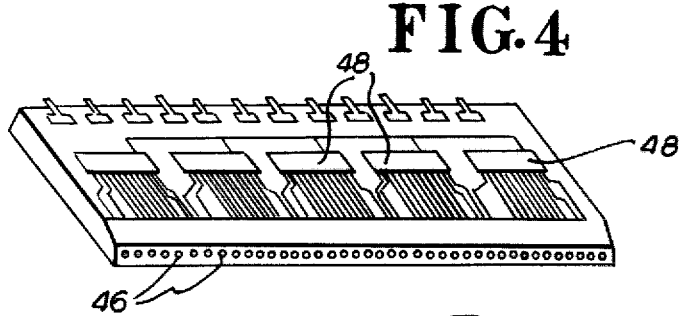
FIG. 4, is a pictoral perspective view of a modular shift-register and LED combination suitable for use along the straight-edge of an apparatus of the invention.

FIG. 4, shows the light emitting diodes 46 of FIG. 3 encapsulated in clear epoxy molded in a beveled shape as shown, similar to that used in conventional drafting scales. In addition is shown shiftregisters 48 on a common substrate with said LEDs, as would be envisioned in a modular straight-edge segment for mass production.

Figure 5A:
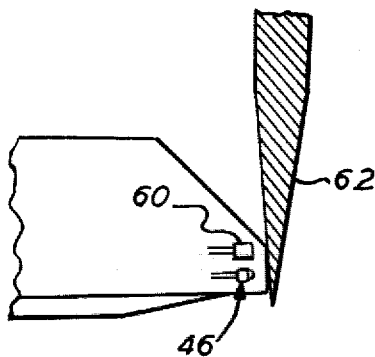
FIG. 5a, is a cross-sectional view of FIG. 5.
Figure 5:
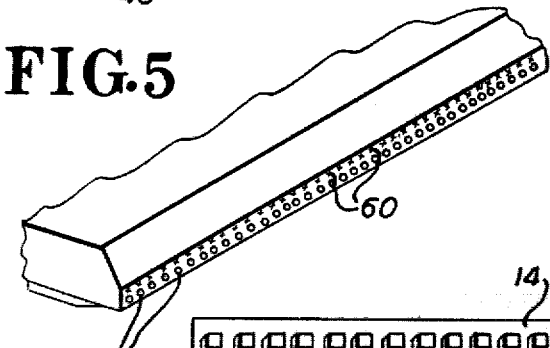

FIG. 5, illustrates a segment as shown in FIG. 4 comprising in addition an array of photosensors 60 arranged adjacent to the edge of the module such that the proximity of a mechanical or other type of pencil 62, shown in FIG. 5a, will cause light from the adjacent lighted segment 46 to reflect off the pencil and into photosensor 60. This method eliminates the need for a moveable cursor selector 20 at the expense of a multiplicity of sensors 60 and a multiplexer capable of monitoring the sensors and providing the microprocessor with a logical "or" of the sensors, which arrangement is not shown. A more detailed description of the method by which microprocessor 41 processes data fed back from photosensors 60 is more completely described hereinafter.

Figure 6:
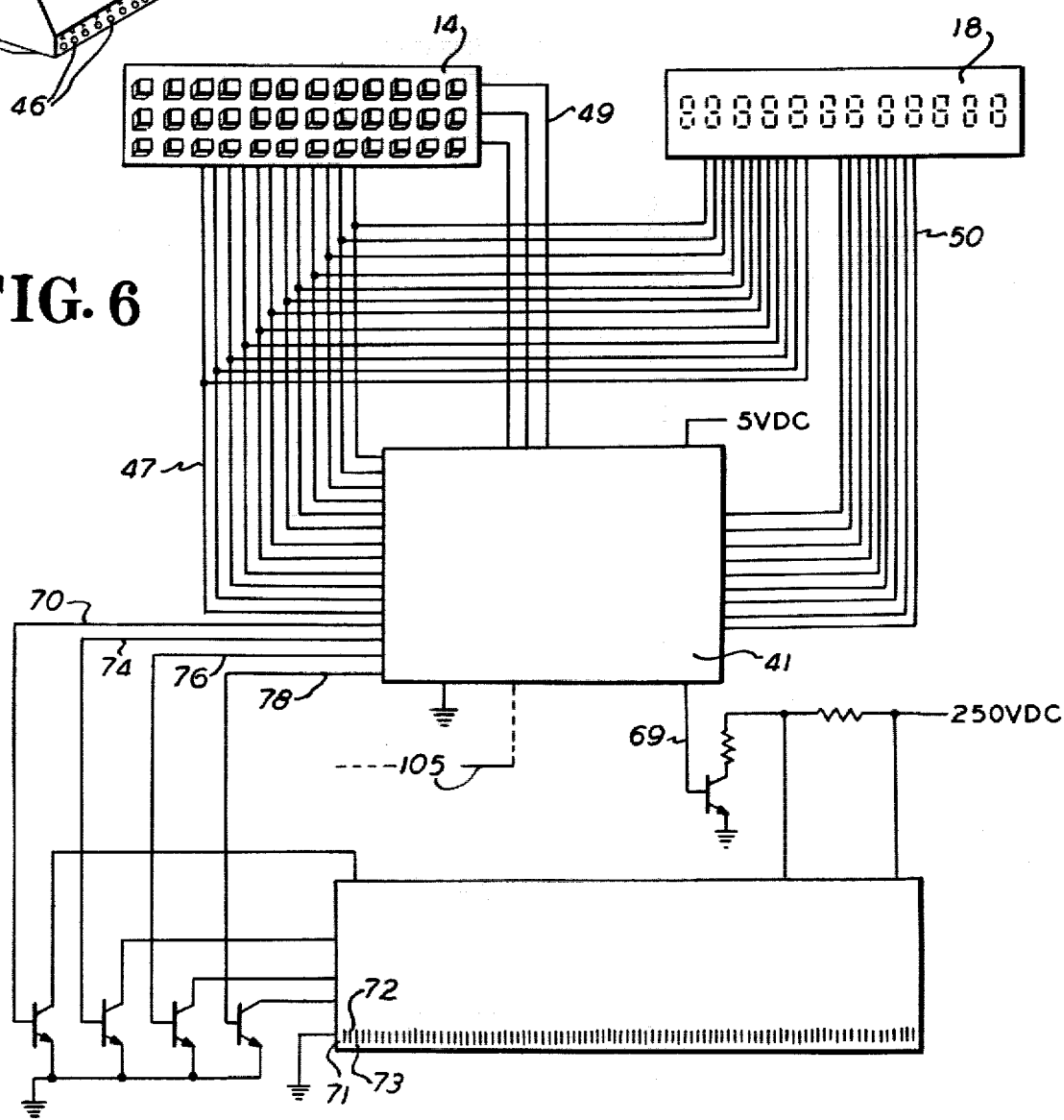
FIG. 6, is a simplified block diagram of the invention showing the general relationship between the keypad, digital display, microprocessor, and plasma display means.

FIG. 6, which is a more separate embodiment of the invention, incorporates a plasma display as against an LED display of the lighted cursor segments. The plasma apparatus has the advantage of not requiring a shiftregister external to the microprocessor, thus substantially reducing costs. In FIG. 6 the microprocessor 41, keypad 14, and numerical display 18 are arranged as previously described for FIG. 3. A difference can be seen in how information is outputted by microprocessor 41 to light individual cursor segments. In operation, continuous refreshing is required in a manner similar to that of the numerical display 18 because no storage is availably external to microprocessor 41. This refreshing is accomplished at sufficient speed by the microprocessor such that the display appears static, typically at 25 Hz or more. In operation, the length of the segment to be displayed is calculated and a number corresponding to the last cursor segment to be lighted is determined. Initially, the anode control line 69 is energized permitting the cursor display to light segments. Reset line 70 is then energized and the first cursor segment 71 will glow. First phase line 74 is energized next and the reset line 70 deenergized, causing the first cursor segment 71 to extinguish and second cursor segment 72 to glow. Second phase line 76 is then energized and first phase line 74 deenergized, causing the second cursor segment 72 to extinguish and the third segment 73 to glow, and so on with third phase line 78. Every third segment is connected in common to one of the three phase control lines, such that only three lines are required to advance the lighted cursor segment any number of positions. This display therefore can be fabricated in any convenient length without a change in microprocessor design.

Typical lengths would be 12 inches, 18 inches or 0.5 meters. Appropriate internally programmed conversion factors will enable the microprocessor to generate an accurate display of any dimensional unit system. For this purpose unit switch 16 is placed on faceplate 12 of FIG. 1.

Once the lighted segment has advanced to a position corresponding to the value displayed in numerical display 18, anode control line 69 is deenergized thereby terminating a further advance of lighted cursor segments. The entire process is then restarted and cycled at a refresh rate high enough to avoid any apparent flicker.

FIGS. 7 and 8, show a plasma cursor array 80 within a glass enclosure 81 in combination with a molded plastic cover 82 having silvered surfaces 83 geometrically arranged such that a lighted segment of the plasma array 80 will have its light reflect within said molded plastic 82 of silvered surfaces 83 until the image of a lighted segment emerges at beveled edge 85 proximate the scale edge.

FIG. 9, is a more detailed view of moveable cursor selector 20 shown in FIG. 1.

FIG. 10, shows means for using the apparatus of this invention in the measuring mode. In this case, the apparatus is equipped with moveable cursor selector 20 which has attached thereto, photosensitive device 92 which is mounted in such a way that it may be slid along the array of cursor segments 95 which are positioned under the moveable cursor selector 20 and in such a way that a lighted cursor segment would illuminate photosensitive device 92. The two electrical connections required for photosensitive device 92 may be provided by means of two mechanical wipers 97 formed of metal stampings. Stationary conducting strips 100 are mounted within the apparatus to provide a connection from the metallic wipers 97 to a phototransistor amplifier, which is not shown, consisting of conventional amplification means. When measure/display key 26 is in "display" mode, circuit operation is as described heretofore. However, when said key is in "measure" mode the circuit operation is as follows. The moveable cursor selector 20 is positioned along the scale adjacent to the end of a segment to be measured by aligning point mark 21 therewith. As the microprocessor illuminates the cursor segments sequentially, sensor input 105 of FIG. 6 is examined by the microprocessor to determine whether the photosensitive device 92 is receiving light. If it is, the microprocessor ceases to energize further segments and the numerical equivalent of the cursor position is displayed at numerical display 18. In this way, the position of moveable cursor selector 20 is continuously displayed as it is displaced. In one arrangement, relative positions of moveable cursor selector 20 can be used to determine the length of a line segment by storing the first measured value and subtracting a second measured value. In another possible arrangement, the radius or diameter of a circle may be similarly measured and the area thereof calculated and displayed.

In another embodiment, which is not shown, a specially designed stylus can be used to monitor the position of the lighted cursor segments in a manner similar to that previously described. In this way, light created by the lighted cursor segment adjacent to the stylus would be conducted therethrough to a photosensitive device within the stylus which in turn is connected to the microprocessor 41. Operation would thereafter be identical to that previously described.

In both LED and plasma embodiments, power can be supplied either by line voltage or battery power. When battery power is used, the entire device can be free standing and mounted to standard scale fixtures as are commonly found on drafting tables, see FIG. 2. Alternatively, the power supply, calculator (microprocessor) and numerical display can be enclosed in a larger enclosure with large keys and displays for more convenient use. Curved, circular and other arrangements of cursor segments for angle or other measurements are envisioned as part of this invention. Further, it is considered appropriate to attach the device of this invention directly to a full scale computer as an input device which would be used under computer-user cooperation conditions.

A brief reference heretofore has been made to nonequally spaced cursor segments. It is anticipated that this invention will have desireable applications in the direct measurement of perspective objects as from photographs as well as in the preparation of perspective drawings and the like.

Figure 11:
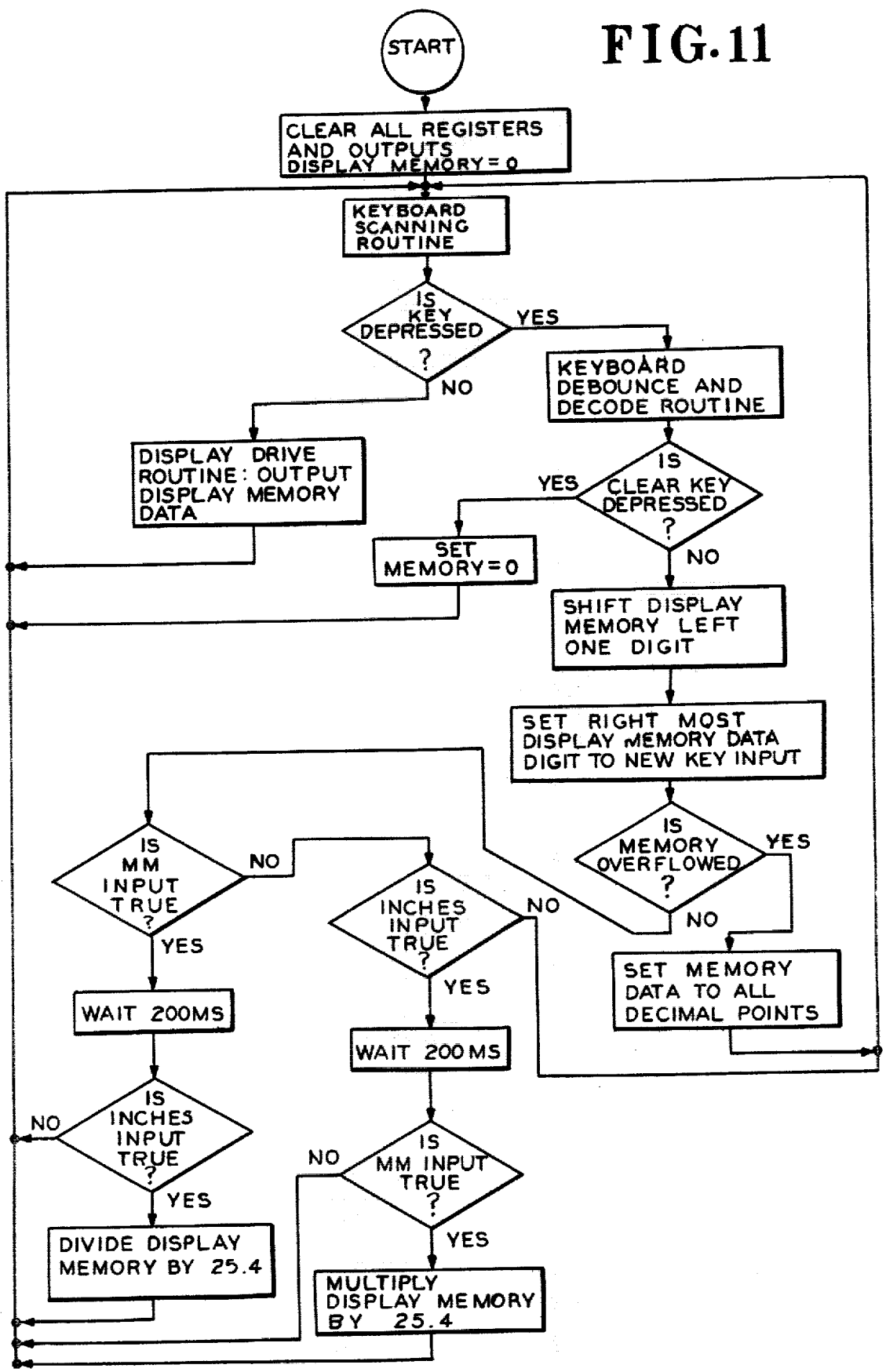
FIG. 11, is a flow diagram representing microprocessor logic for rudimentary data processing.

FIG. 11, shows a flow diagram for microprocessor logic wherein all registers and outputs are cleared and display memory is set to zero. Next, keyboard scanning takes place to detect inputted characters. If a key has been depressed on the input keyboard, debounce and decode routines are employed and a check is made of the clear key to determine if it has been depressed. If it has been depressed, display memory is set to zero and the flow logic returns to the keyboard scanning routine. If the clear key has not been depressed, then display memory is shifted to the left one digit and the rightmost display memory data is set equal to the new key input. Test is thereafter made for overflow of display memory and, if found, all memory display data positions are set equal to decimal points and the keyboard scanning routine is resumed. If no overflow is experienced, a unit selection key is examined to determine its position. If the mm. selection has been made, a 200 milisecond wait is encountered. Next an examination of the unit selection key is made to determine if the IN, selection has been made. If IN, units are chosen, the display memory is divided by 25.4 and return is made to the keyboard scanning routine. If the IN, selection has not been made then no division by 25.4 is done and the logic returns to the keyboard scanning routine. On the possibility that the mm. selection has not been made, the logic determines next whether inches have been selected, if not, return is made to the keyboard scanning routine. On the other hand, if inches have been selected, a wait of 200 milliseconds is experienced whereafter a test for mm. selection is made. If mm. selection was made, display memory is multiplied by 25.4. If otherwise, return is made to the keyboard scanning routine. In going back to whether or not a key has been depressed in the initial stages of the flow sequence of FIG. 11, if the key depression test results in a "no," the logic requires that the display drive routine be implemented to display memory data, whereafter the logic returns to the keyboard scanning routine. It should be noted that FIG. 11 encompasses keyboard input combined with unit selection and display memory adjustments based on the units chosen.

Figure 12:
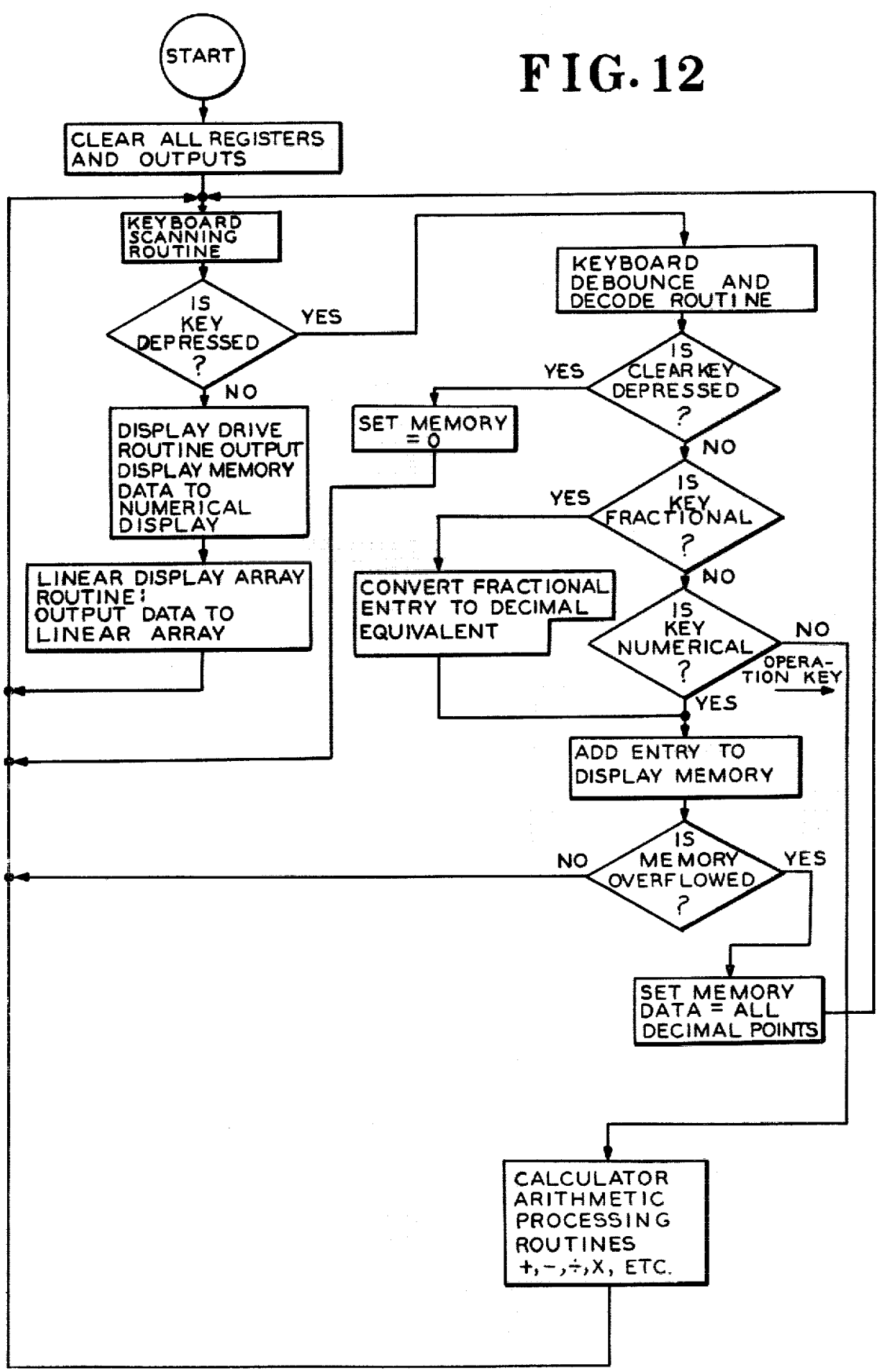
FIG. 12, is a flow diagram representing microprocessor logic including additional arithmetic logic enabling the apparatus to be used as a calculator.

FIG. 12, shows the logic flow diagram of a microprocessor employed in this invention which, in addition to the flow diagram of FIG. 11, employs calculator processing routines which enable the operator to use the device as a calculator as well as a distance measuring and displaying apparatus. In this flow diagram all registers are cleared as well as all outputs. Keyboard scanning begins and, if a key has been depressed, keyboard debounce and decode routines are employed. Next a test is made of the clear key. If depressed, memory is set equal to zero and keyboard scanning begins again. If not depressed, a test is then made for whether the depressed key as a fractional key. If so, a conversion from fractional to decimal is made. If the key is not fractional, a test is made to determine if the key is numerical. If the key is not numerical the flow diagram concludes that the calculator mode is to be employed and calculator routines are employed to produce the output desired. If the key is numerical, on the other hand, the value of that key is added to the display memory. Thereafter, a test for memory overflow is performed. If overflow is experienced all memory is set equal to decimal points and keyboard scanning resumes. If memory is not overflowed, then keyboard scanning resumes. It will be noted that the logic in FIG. 12, although deleting the units testing experienced in FIG. 11, has added a fractional key logic flow and a calculator logic flow. As with FIG. 11, FIG. 12 indicates initially in the flow diagram, if the test for whether a key is depressed is negative, that the display memory drive routine is employed such that numerical data is diaplayed and, whereafter, a linear array display routine is employed to output data and to a linear array which would produce two lighted elements spaced apart by a distance equal to the numerical value displayed in the numerical display.

Figure 13:
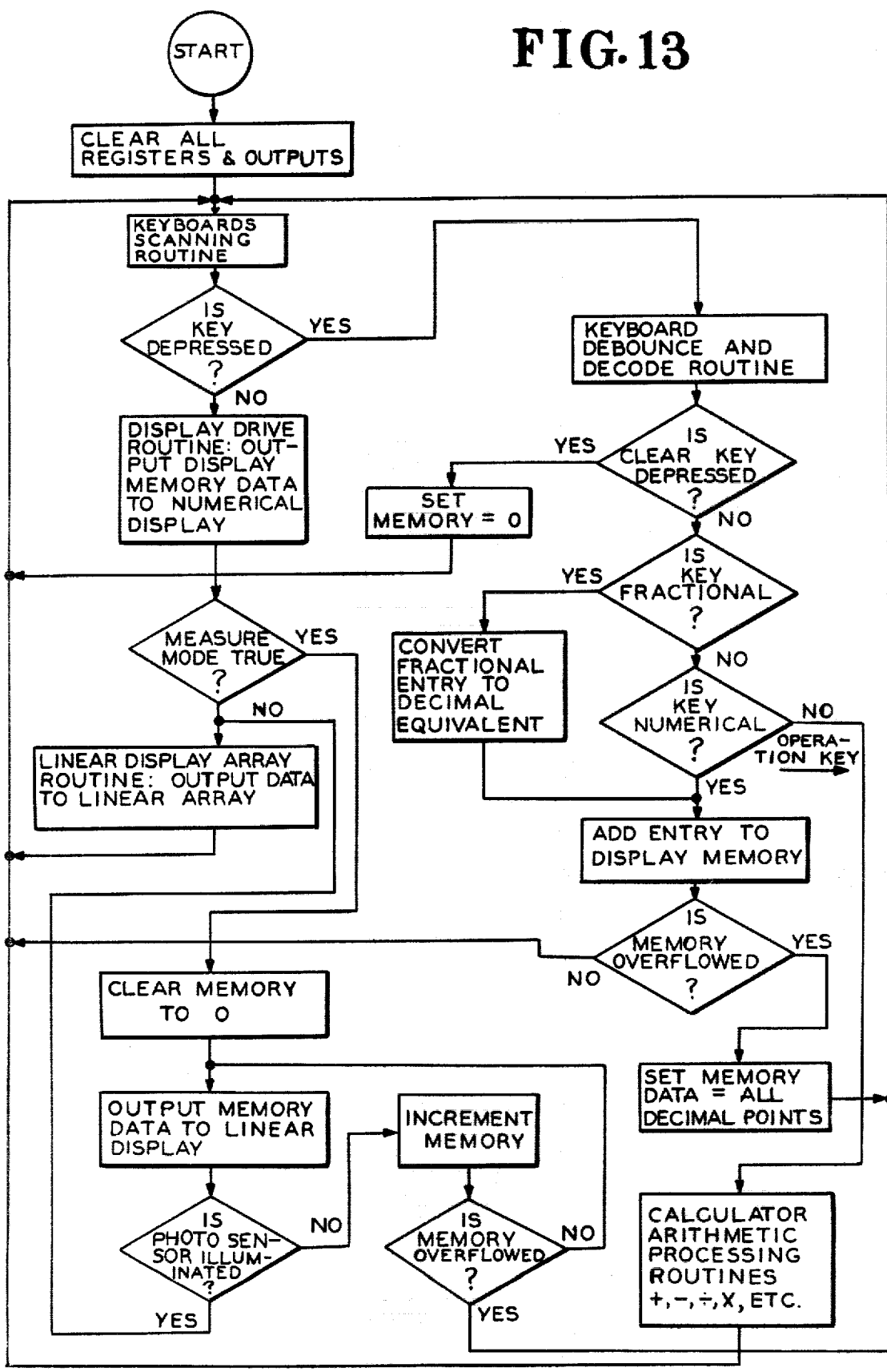
FIG. 13, is a flow diagram similar to FIGS. 11 and 12 which includes logic enabling the input of measurement information as well as numerical data for measurement of distances.

FIG. 13, shows a logic flow for a microprocessor employed in this invention wherein all registers and outputs are cleared and keyboard scanning begins. When a depressed key is sensed, keyboard debounce and decode routines are employed. A test is then made to determine whether the clear key has been depressed. If so, then memory is set to zero and keyboard scanning is resumed. If not, a test is made to determine whether the key is fractional. If it is, the fractional value is converted to its decimal equivalent and if the key is not fractional a test is made to determine whether the key is numerical. If not numerical, the logic concludes that calculator mode has been chosen and arithmetic processing is executed consistent with keyboard instructions, whereafter keyboard scanning resumes. If the key was found to be numerical, the value of the depressed key is added to the display memory and memory is tested for overflow. If it is not overflowed, then keyboard scanning is resumed. If it is overflowed, then memory data is set equal to decimal points and keyboard scanning resumes. Referring now to an earlier step in the diagram, when a test is made for whether a key has been depressed, if not depressed, then a display drive routine is employed to display memory data on the numerical display. Whereafter, a test is made to determine whether measure mode has been selected. If not, a linear array display routine is executed as described in FIG. 12. If measure mode is selected then memory is cleared to zero and memory data is outputted to the linear display. Whereafter, a test is made to determine whether a photosensor has been illuminated, which photosensor is represented by element 92 in FIG. 10. Clearly alternative means can be chosen and the flow diagram altered to accommodate the particular means used in sensing the position chosen by the operator. In this case, however, if the photosensor is not illuminated, memory is incremented and tested for overflow. If overflow is not found, then memory data is displayed on the linear display and photosensor illumination is tested again. If memory is overflowed, then keyboard scanning is resumed. It should be noted that FIG. 13 introduces the logic flow for measure mode using a moveable cursor selector as shown in FIG. 10. In none of the preceding flow diagrams has there been an introduction of a scale selection option. However, such scale selection logic would be equivalent to logic employed in unit selection of FIG. 11 where the scale chosen would be divided into memory or multiplied by memory to yield the appropriate display.

An embodiment of this invention having a construction somewhat varied from that previously described and not shown in any figure would employ light controlling elements, by which is meant either electrically activated elements such as LED types which emit light, or electrically controlled liquid crystal displays which either reflect light or block the transmission of light or any other electrically activated light controlling means which results in the display of a visually sensible mark along an array to indicate the end point of a distance being displayed. Incorporation of such electronically activated light controlling means are envisioned in this embodiment being placed assuming a British unit scale, at one inch intervals from 0 to 12 inches. A distance of 12 inches would employ 13 light controlling means being equally spaced apart a distance of one inch. In addition to these spaced apart light controlling means, would be one inch of high density light controlling means from the zero mark to minus one inch. A useful density for drafting purposes would be 0.020 in. center to center of the light controlling means. In display mode, when a number is entered into the keypad input, the number would be displayed first by display of the integer value in inches on the one inch increment of the display array, e.g., for 5.25 inches, the light controlling means at the five inch location on the one inch separation or low density portion of the array would be activated. Thereafter the light controlling means located within the high density portion of the array representing the fractional remainder of the distance to be displayed would be displayed and displaced from the zero inch mark by shiftregister means heretofore described for controlling the linear display. The combination of the five inch mark light controlling element and the high density light controlling element would represent a distance therebetwen equal to the number displayed in the numerical display. On measurement, one procedure would be to depress a key indicating that a measurement is to be taken. Thereafter, by input of a number representing the integer value in inches located at one end of the distance being measured, the light controlling means at that value would be activated, then the operator would align the mark with one end of the distance being measured. The other end of the distance being measured will then be in the zero to minus one inch region of the array. A variable resistor or other such device would be used to input to the microprocessor to cause the microprocessor to sequentially activate light controlling means in the said high density region and the operator would stop when the light controlling element opposite the other end of the distance being measured is activated. At this time the microprocessor will display the numerical value of the distance between the two activated light controlling elements.

Although the preferred embodiments have been described herein, it is possible to incorporate equivalent components and designs into an apparatus without departing from the concept of the invention and, while this invention has been described using preferred designs, it is to be understood that there has been no intention to limit the scope of this invention or to exclude any designs which follow the general principles set forth herein. It is anticipated that numerous variations including the manufacture of special large scale integrated circuits are possible and even desireable.

What is claimed is:

1. An electronic measuring apparatus comparing:
   (a) a plurality of light controlling elements arranged and spaced apart and forming a high density zone and a low density zone said high density zone and said low density zone being contiguous to one another with the high density zone having a greater number of light controlling elements than the low density zone per unit length;
   (b) measuring means for energizing said light controlling elements in each of said zones respectivily to define the beginning and end of a distance to be measured;
   (c) measuring input means providing selectability of at least one of said light controlling elements contiguous to the endpoint of the distance to be measured; and
   (d) electronic control means responsive to said measuring input means for controlling said measuring means and for generating electronic data which is a function of the distance to be measured.

2. An apparatus an described in claim 1 wherein the high density zone is of a length equal to the distance between the light controlling elements of the low density zone.

3. An apparatus as described in claim 1 wherein the plurality of light controlling elements are arranged in a curvilinear form.

4. An apparatus as described in claim 1 further including numerical display means interconnected to said electronic control means to receive and display electronic data therefrom.

5. An apparatus as described in claim 1 wherein the measuring means for said high density zone comprises a variable resistor interconnected to the electronic control means whereby light controlling elements in the high density zone can be selectively energized in response to changes in the resistance of said variable resistor.

6. An apparatus as described in claim 1 wherein the measuring input means comprises a keypad which inputs to the electronic control means such that a specific light controlling element is activated for a given keypad entry.

7. An apparatus as described in claim 1 wherein the measuring input means comprises an encoding wheel.

* * * * *